A. L. GLASS.
HEN'S NEST.
APPLICATION FILED APR. 20, 1908.
912,465.
Patented Feb. 16, 1909.
2 SHEETS—SHEET 1.
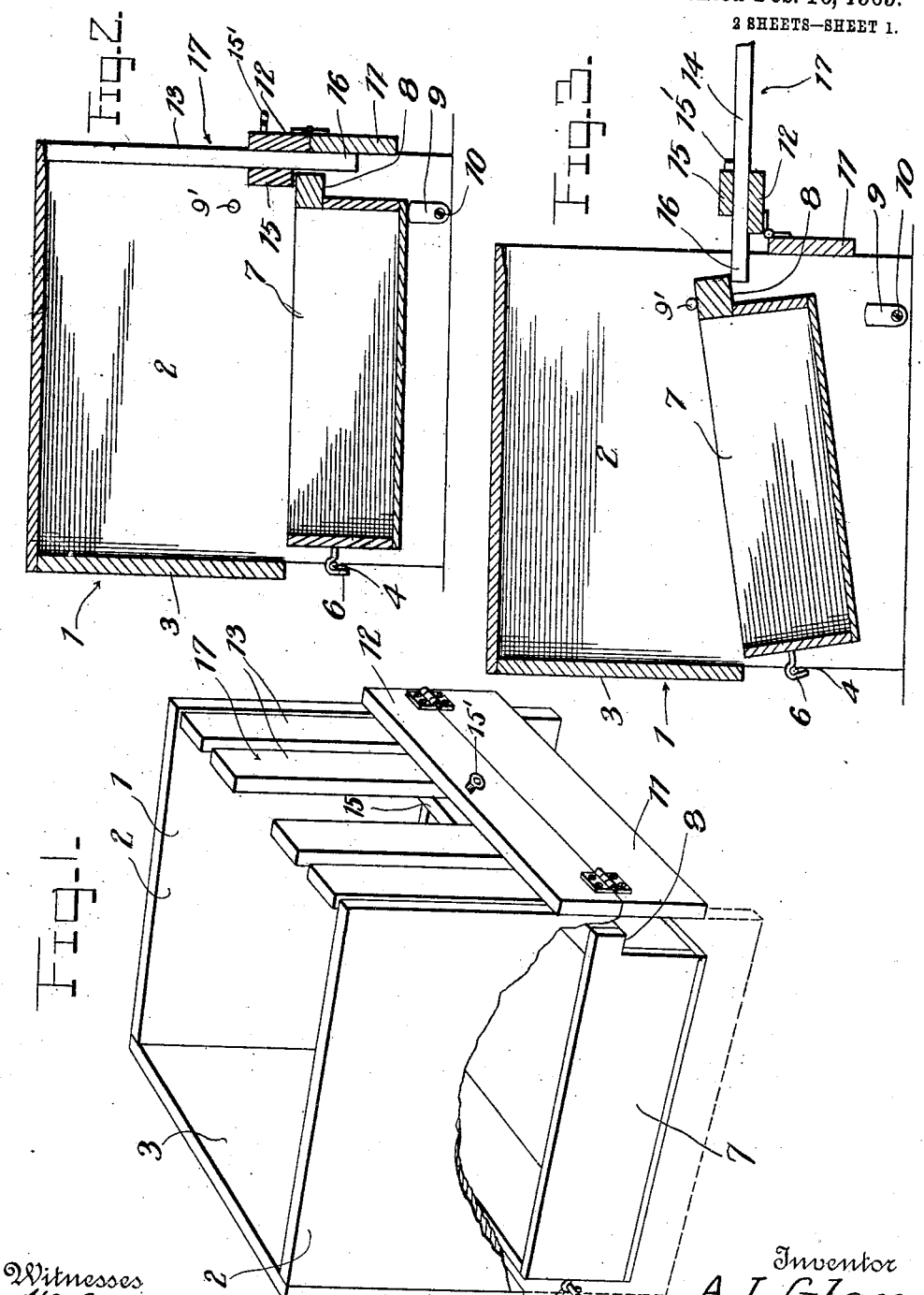
Witnesses
M. A. Rockwell
C. H. Griesbauer
Inventor
A. L. Glass
By H. B. Willson &co
Attorneys
THE NORRIS PETERS CO., WASHINGTON, D. C.

A. L. GLASS.
HEN'S NEST.
APPLICATION FILED APR. 20, 1908.
912,465.
Patented Feb. 16, 1909.
2 SHEETS—SHEET 2.
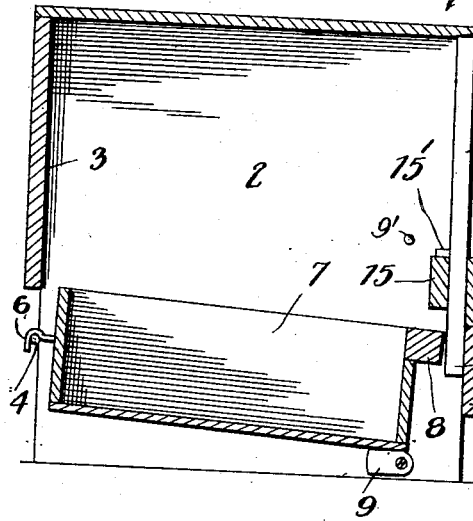
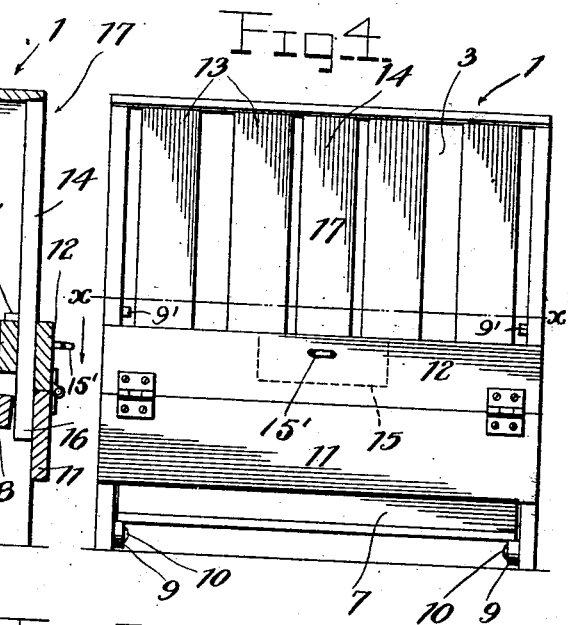
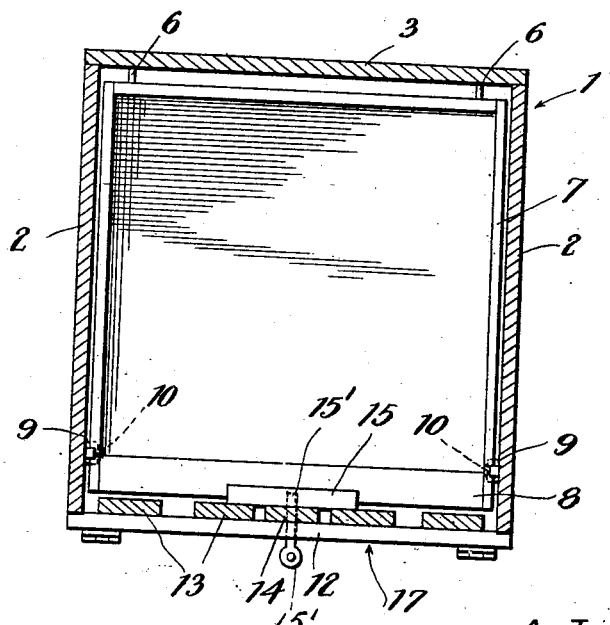
Witnesses
W. H. Rockwell
C. H. Griesbauer
Inventor
A. L. Glass
By H. B. Willson &co
Attorneys
THE NORRIS PETERS CO., WASHINGTON, D. C.

UNITED STATES PATENT OFFICE.

ARTHUR L. GLASS, OF HOPKINS, MISSOURI.

HEN'S NEST.

No. 912,465.  Specification of Letters Patent.  Patented Feb. 16, 1909.

Application filed April 20, 1908. Serial No. 428,184.

*To all whom it may concern:*

Be it known that I, ARTHUR L. GLASS, a citizen of the United States, residing at Hopkins, in the county of Nodaway and State of Missouri, have invented certain new and useful Improvements in Hens' Nests; and I do declare the following to be a full, clear, and exact description of the invention, such as will enable others skilled in the art to which it appertains to make and use the same.

My invention relates to nests and particularly to combination laying, setting and trapping nests.

The invention has for its object the provision of means which enables the nest to be converted from a laying or setting nest into a trapping nest at a moment's notice.

With these and other objects in view, the invention consists of certain novel features of construction, combination and arrangement of parts, as will be more fully described and particularly pointed out in the appended claims.

In the drawings, Figure 1 is a perspective view of the device when used as a laying or setting nest with parts of the structure broken away, Fig. 2 is a longitudinal vertical sectional view thereof, Fig. 3 is a similar sectional view with gate lowered, Fig. 4 is a front elevation of the nest when used for trapping the hens, Fig. 5 is a longitudinal vertical sectional view with the gate closed, Fig. 6 is a horizontal sectional view on the line x—x of Fig. 4.

Referring more especially to the drawings, 1 represents the box of the nest which is composed of side members 2, a back member 3 and a top for connecting these members. In the back of the interior of the nest and extending from side to side is a transverse rod 4, secured to the side members and adapted to form a pivotal shaft for the hooks 6, which are secured to the rear end of the nest. This nest is made in the form of a box of sufficient size to fit properly within the casing 1, and having at its forward upper end a transverse extension or lip 8, to be hereinafter described. The rods 4 support the rear end of the box, the front end thereof being supported by a shiftable button or stud 9, journaled upon a stub shaft or screw 10, entering the side of the casing. There are preferably two of these buttons, one on either side so as to support both sides of the nest properly. A suitable stop such as a pin 9' secured in the side of the box is employed to limit the upward movement of the nest 7. Secured to the front edges of the side members is a guard board 11, to which is hinged a cleat 12, having projecting thereabove the slats 13, all of which are rigidly secured to the cleat 12 by screws or other suitable means except the center slat, which is removably secured between the cleat 12 and the batten 15 by a pin 15', so that this slat may be removed at any time. All of the slats have a projection 16, which when in vertical position overlies the guard board 11, and when in horizontal position rests under the lip 8. When the device is used for a trap nest the button 9 is turned down in a position shown in Fig. 4 and the gate 17 formed by the slats 13 and 14 is turned down in the position shown in Fig. 3.

When the hen passes over the gate 17 to the chambers in the box 7 her weight depresses the forward end of the box which acts upon the extension 16 and throws the gate to the vertical position shown in Fig. 5. The slat 14 is maintained in place when used as a trap nest so that the hen cannot stick her head out between the slats and force the gate forward to a horizontal position. This is also prevented by the front edge of the lip 8 engaging the extension as shown. It is, therefore, necessary to raise the button 9 to a vertical position before the gate can be operated.

When the device is used as a setting or laying nest the buttons are turned to the vertical position and the slat 14 removed so that if the hen wishes to leave the nest she may push her head through the opening, and by pushing outwardly the door yields and assumes a horizontal position and the gate is left open for free entrance.

In all instances while a hen is on the nest no others can enter and attempt to eject the original user.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what

I claim and desire to secure by Letters Patent is:

1. In a nest, a casing, an egg receptacle pivoted therein, a gate, means carried by the receptacle for engaging the gate to operate the same whereby it will close the casing, means on the gate for holding the receptacle in raised position and variable means for limiting the movement of the receptacle.

2. In a nest, a casing, an egg receptacle pivoted therein, variable means for limiting the downward movement of the receptacle, a gate, and means carried by the receptacle for locking the gate when the gate is in its lowered position.

3. In a nest, a casing, an egg receptacle pivoted therein, a turn button adapted to limit the downward movement of the receptacle, a gate for closing the casing, and a lip on the receptacle adapted to engage the gate and hold it locked when the button is turned.

4. In a nest, a casing, a button adapted to assume a plurality of positions, an egg receptacle pivoted in the casing and having one end adapted to rest upon the button in one of its positions, a lip on the receptacle, a gate for closing the receptacle, means carried by the gate and adapted to be engaged by the receptacle for locking the gate in closed position when the button is in its other position.

In testimony whereof I have hereunto set my hand in presence of two subscribing witnesses.

ARTHUR L. GLASS.

Witnesses:
SAMUEL A. BLOCK,
OLIVER YOUNG.